United States Patent

Ponce

[15] 3,675,462

[45] July 11, 1972

[54] ADJUSTABLE STAMPING PRESS STOCK GUIDE

[72] Inventor: Lucien G. Ponce, 1346 Chestnut Boulevard, Cuyahoga Falls, Ohio 44223

[22] Filed: Oct. 8, 1970

[21] Appl. No.: 79,211

[52] U.S. Cl. ............................................. 72/428, 72/361
[51] Int. Cl. .................................. B21d 22/00, B21d 43/16
[58] Field of Search ............... 72/428, 361, DIG. 11; 83/162, 83/440, 539; 269/309

[56] References Cited

UNITED STATES PATENTS 2,530,222  11/1950   Bohaboy ................................72/428

*Primary Examiner*—Charles W. Lanham
*Assistant Examiner*—R. M. Rogers
*Attorney*—Hamilton, Cook, Renner & Kenner

[57] ABSTRACT

A stock guide for feeding stock to the die of a stamping press. The guide has a base member adjustably mounted on the anvil of the press adjacent to the stamping die and a guide table mounted for vertical adjustment on the base member, with an aligning bar adjustably mounted on the table.

4 Claims, 4 Drawing Figures

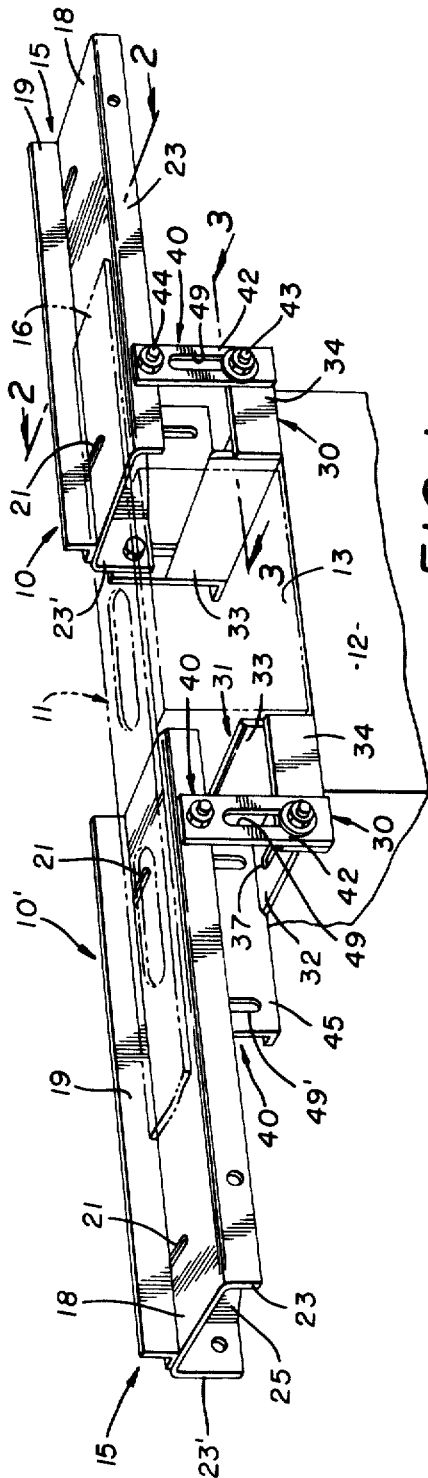
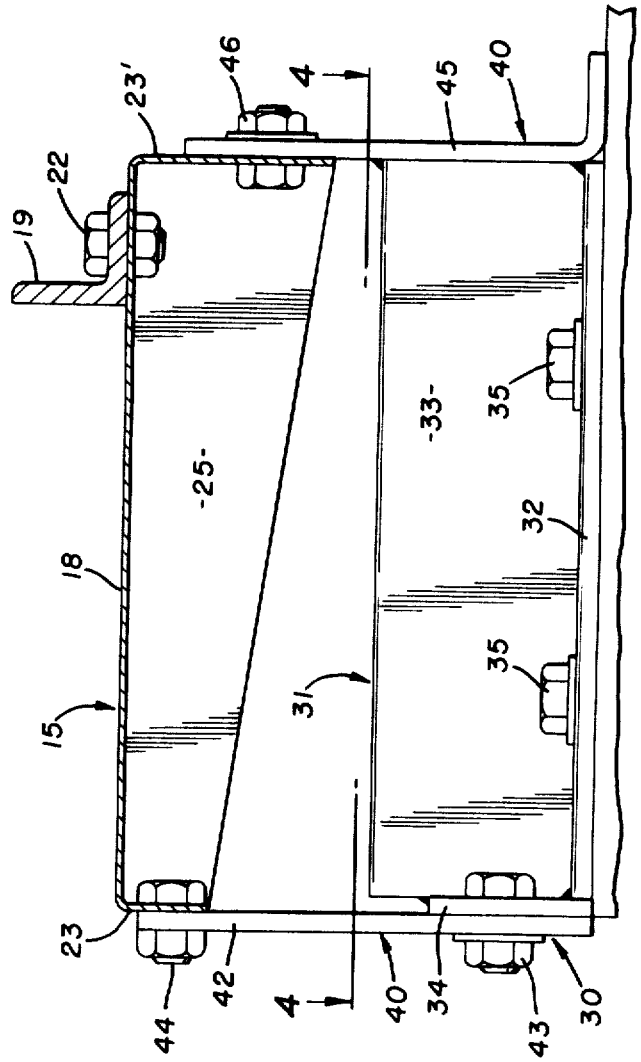
FIG. 1
FIG. 2
INVENTOR.
LUCIEN G. PONCE
BY Hamilton, Cook,
Renner & Kenner
ATTORNEYS

INVENTOR.
LUCIEN G. PONCE
ATTORNEYS

ADJUSTABLE STAMPING PRESS STOCK GUIDE

BACKGROUND OF THE INVENTION

The present invention relates to a stock guide for a stamping press. More specifically, the invention relates to an adjustable stock press stamping guide capable of use with various types and sizes of stamping dies in a stamping press.

Heretofore, in the field of stamping presses, the prevalent practice in the building of special as well as many conventional stamping dies has been to incorporate or build-in a stock guide into each such die. This practice arises from the fact that many stamping presses do not have a table guide. Of the presses which do have a table guide, a large number are not adaptable to special as well as to various sized dies. The additional labor and tooling required for the built-in stock guide incurs, of course, a substantial expense and often results in wasted effort since the guide is subject to breakage. Furthermore, a die having a built-in stock guide requires additional storage space.

Other presses utilize clamping arms which engage and secure the workpiece as well as transport it to and from the appropriate location for the stamping operation. The arms thus alleviate the necessity of building in a stock guide on the stamping die. However, the complexity required of the mechanism results in a very costly apparatus. Additionally, a slower production rate exists since the feeding cycle of such presses is slower than conventional methods of feeding stock material to a press.

SUMMARY OF THE INVENTION

It is therefore, an object of the present invention to provide a novel stock guide for the die of a stamping press.

It is another object of the present invention to provide a stock guide which eliminates the requirement of a built-in stock guide in a stamping die.

It is yet another object of the present invention to provide a stock guide, as above, which is adjustable and therefore suitable for use with various types and sizes of stamping dies.

It is a further object of the present invention to provide a stock guide, as above, which is noncomplex, inexpensive, and substantially reduces the manufactured cost of a stamping die.

These and other objects of the present invention, together with the advantages thereof over existing and prior art forms which will become apparent from the following specification, are accomplished by the improvements hereinafter described and claimed.

In general, a stock guide for use with the die of a stamping press has a base which is secured to the anvil of a stamping press. A guide table which serves to align the feed stock is mounted on the base by adjustable connecting means. The stock guide is so constructed that the guide table is adjustable horizontally and vertically to accommodate various types and sizes of dies.

In general, one preferred embodiment of the present invention is described in detail without attempting to discuss all of the various modifications in which the invention might be embodied; the invention being measured by the appended claims and not by the details of the specification.

DESCRIPTION OF THE DRAWINGS

FIG. 1 is a perspective of two symmetrical stamping press stock guides situated on a press bed and about a die shown in phantom.

FIG. 2 is an enlarged vertical side elevation of the right stock guide taken on line 2—2 of FIG. 1.

DESCRIPTION OF THE PREFERRED EMBODIMENT

Figure 3:
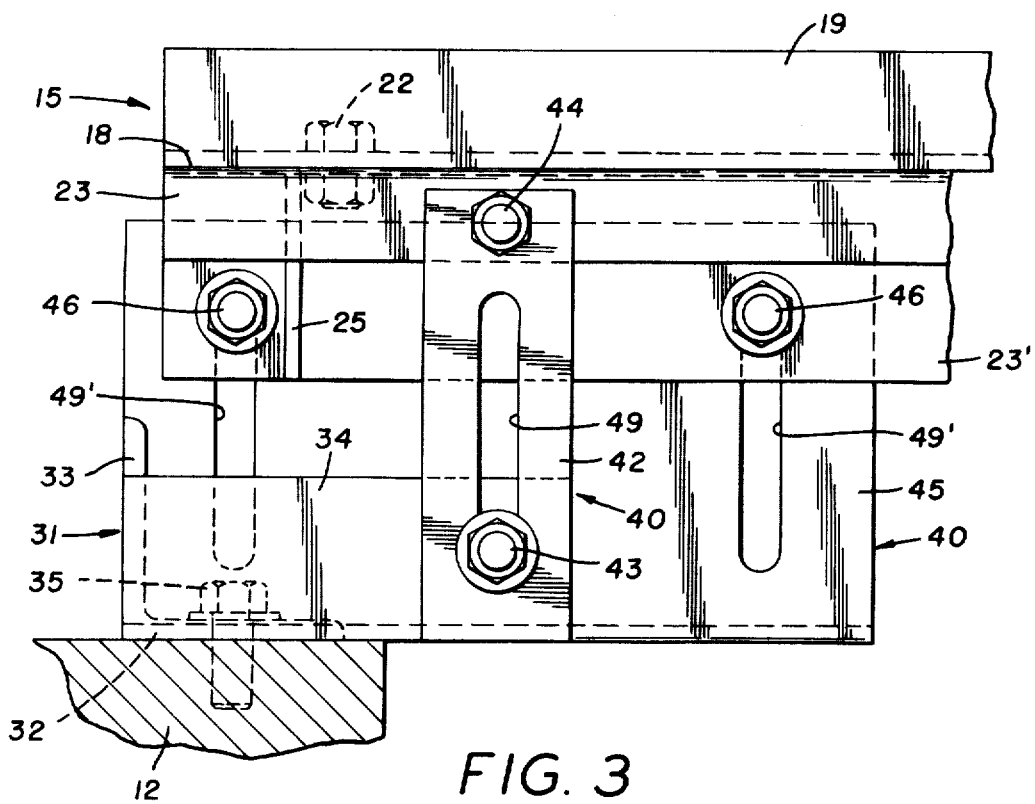
FIG. 3 is an enlarged front elevation taken on line 3—3 of FIG. 1.
Figure 4:
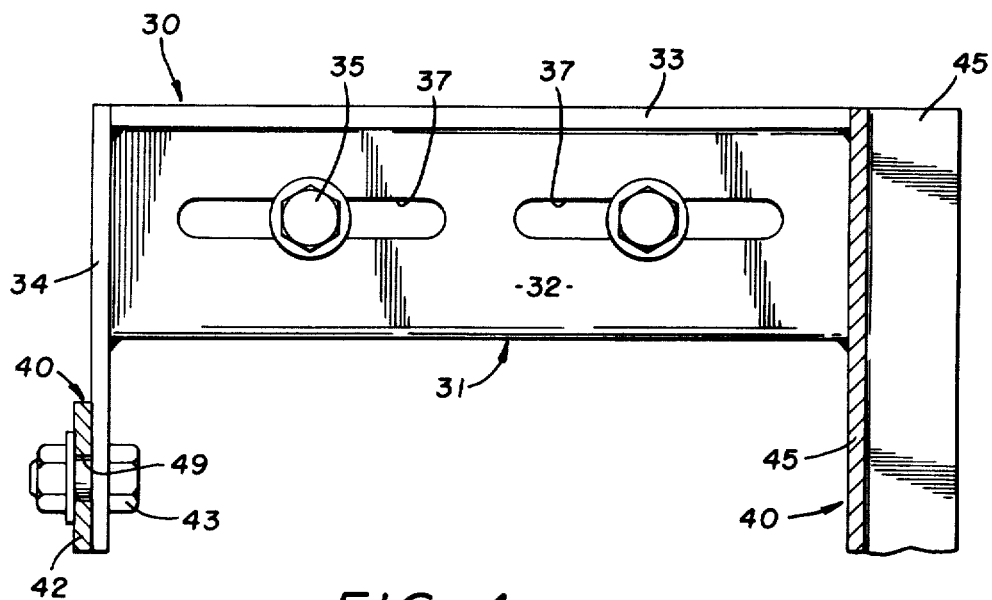
FIG. 4 is an enlarged plan view taken substantially on line 4—4 of FIG. 2.

In general, a stock guide for the die of a stamping press according to the concept of the present invention is indicated in FIG. 1 by the numeral 10. As shown in FIG. 1, it is desirable to have two stock guides 10 and 10' of opposite hand positioned on either side of die 11 so that one guide acts as the feed support and the other guide acts as the take-away support. Of course, use of the take-away support is optional. Press anvil 12 constitutes the lower part of a stamping press and supports die 11 as well as stock guides 10 and 10'. Each of the stock guides has a guide means or member 15 which aligns and supports either the feed stock or workpiece 16 shown in phantom or the stamped article, not shown. The guide means may consist of table 18 and aligning bar 19 to guide the workpiece in a longitudinal direction. Slots 21 in table 18 permit aligning bar 19 to be moved horizontally, transversely to the longitudinal direction of the workpiece in order to position or center workpiece 16 with respect to the die. Referring to FIG. 2, aligning bar 19 may simply be "L" shaped as an angle iron and is attached to table 18 by any conventional means such as bolts 22 passing through slots 21. Table plate 18 preferably has vertical legs or flanges 23 and 23' at opposite sides and is further strengthened by reinforcing webs 25.

Base member 30 of stock guide 10 preferably is an angle iron 31 having a base leg 32 and a side leg 33 with both legs being welded to a front plate 34. The base member through base leg 32 is secured to bed 13 of press anvil 12 by any conventional means such as bolts 35. Transverse slots 37 in which bolts 35 seat are provided in base leg 32 to provide further transverse adjustment of guide member 15 with respect to die 11.

Base member 30 is joined to guide member 15 by connector means 40. As seen in FIGS. 1 and 3, connector means 40 comprises a forward link 42 and a rearward link 45. Forward link 42 at one side is secured to front plate 34 through bolts 43 and at the other end is secured to forward table leg 23 through bolts 44. Rear link 45 is welded at its bottom to the base leg 32 and is connected at its top through bolts 46 to rearward table leg 23'. In order to compensate for the differences in height of the various types and sizes of dies, the links have slots 49 and 49' which permit vertical movement of table 18. Preferably, at least one of the links such as rear link 45 has a sufficient longitudinal dimension to accommodate two slots and thus add rigidity to the guide means.

From the foregoing, it should be readily apparent that adjustable stock guide 10 alleviates the need of a built-in die guide and can be used to fit a wide variety of such dies. Base plate slots 37 along with table slots 21 provide transverse adjustment to position workpiece 16 in alignment with die 11. Slots 49 and 49' in the links provide vertical adjustment of the guide with respect to the die.

It should thus be evident that a stock guide constructed according to the concept of the present invention as described herein, accomplishes the aforementioned objectives and otherwise substantially improves the stock guide art.

What is claimed is:

1. A stock guide for feeding stock to a stamping press, comprising:
   a. a base adapted to be mounted on the anvil of the press adjacent to the stamping die;
   b. a guide table extending longitudinally of the direction of feed of stock to the die;
   c. connector means vertically adjustably mounting said table on said base; and
   d. a longitudinal aligning bar adjustably mounted on said table for adjustment transversely thereof.

2. A stock guide as in claim 1, wherein the connector means are slotted links and bolts connecting opposite sides of said table to said base.

3. A stock guide as in claim 2, wherein at least one side of the table is connected to the base by two longitudinally spaced links.

4. A stock guide as in claim 1, wherein said base has transverse slots for connecting said base to the press anvil for transverse adjustment thereon.

* * * * *